US006032081A

United States Patent [19]

Han et al.

[11] Patent Number: 6,032,081

[45] Date of Patent: Feb. 29, 2000

[54] DEMATRIXING PROCESSOR FOR MPEG-2 MULTICHANNEL AUDIO DECODER

[75] Inventors: Young Tae Han; Jong Seog Koh; Soon Hong Kwon, all of Taejeon, Rep. of Korea

[73] Assignee: Korea Telecommunication Authority, Seoul, Rep. of Korea

[21] Appl. No.: 08/721,088

[22] Filed: Sep. 24, 1996

[30] Foreign Application Priority Data

Sep. 25, 1995 [KR] Rep. of Korea ...................... 95-31604

[51] Int. Cl.[7] ...................................................... G06F 17/00

[52] U.S. Cl. ............................................. 700/94; 704/500

[58] Field of Search ........................... 364/400.1; 700/94; 704/203, 204, 500, 501

[56] References Cited

U.S. PATENT DOCUMENTS 5,463,424 10/1995 Dressler .

OTHER PUBLICATIONS

Sung–Chul Han et al, "An ASIC Implementation of the MPEG–2 Audio Decoder", IEE Transaction on Consumer Electronics, vol. 42, No. 3, , pp540–545, Aug. 1996.

*Primary Examiner*—Minsun Oh Harvey
*Attorney, Agent, or Firm*—Merchant & Gould P.C.

[57] ABSTRACT

A dematrixing processor for an MPEG-2 multichannel audio decoder, which is capable of performing a decoding matrix process with respect to five compositely decoded signals to restore them to their original status. To this end, the dematrixing processor comprises an arithmetic/control logic unit for performing a dematrixing operation with respect to the five compositely decoded signals to restore them to their original status, and an IIR filter for low pass filtering an output signal from the arithmetic/control logic unit and providing the low pass filtered result to the arithmetic/control logic unit.

9 Claims, 5 Drawing Sheets

DEMATRIXING PROCESSOR FOR MPEG-2 MULTICHANNEL AUDIO DECODER

BACKGROUND OF THE INVENTION

1. Field of the Invention

The present invention relates in general to dematrixing processors for moving picture experts group-2 (referred to hereinafter as MPEG-2) multichannel audio decoders, and more particularly to a dematrixing processor for an MPEG-2 multichannel audio decoder which is capable of performing a decoding matrix process with respect to a plurality of compositely decoded signals to restore them to their original status.

2. Description of the Prior Art

The MPEG-2 has prescribed the international standards on audio and video signal compression expression methods. Generally, an MPEG-2 audio channel combination includes five channels based on a 3/2 configuration. Namely, the audio channel combination includes three channels of left (referred to hereinafter as L), right (referred to hereinafter as R) and center (referred to hereinafter as C), and two channels of left surround (referred to hereinafter as LS) and right surround (referred to hereinafter as RS). In an MPEG-2 audio decoder, signals of the fivo channels L, R, C, LS and RS are compositely decoded into signals LO, RO, T2, T3 and T4, in which LO signifies the left channel in stereo, RO signifies the right channel in stereo, and T2, T3 and T4 signify three transmission channels for the multichannel signal process. The five compositely decoded signals LO, RO, T2, T3 and T4 must be restored to their original status $L_w$, $R_w$, $C_w$, $LS_w$ and $RS_w$, in which the subscript "W" signifies the weighting in an audio encoding.

The MPEG-2 layer 2 is the extension of MPEG-2 layer 1. The MPEG-2 layer 1 includes only the left and right channels and the MPEG-2 layer 2 includes three channels in addition to the two channels in the MPEG-2 layer 1. The MPEG-2 layer 2 utilizes the stereo left and right channels LO and RO to allow the user with the MPEG-2 layer 1 system to listen to tho MPEG-2 layer 2 sound. In this case, the stereo left and right channels LO and RO include all the five channel signals in the MPEG-2 layer 2. For this reason, the MPEG-2 layer 2 coder must perform an inter-channel matrixing operation. At this time, channel matrixing information is contained in two parameters, or dematrix procedure (referred to hereinafter as DP) and transmission channel allocation (referred to hereinafter as TC). The MPEG-2 audio decoder performs a dematrixing operation on the basis of the parameters DP and TC as shown in the following Table 1. The dematrixing operation is implemented by the combination of addition and subtraction, The following Table 1 shows a decoding matrix process based on the transmission channel allocation.

TABLE 1

| TRANSMISSION CHANNEL_ALLOCATION | DECODING MATRIX |
|---|---|
| 0 | $L_W$ = LO-T2-T3 |
| | $R_W$ = RO-T2-T4 |
| | $C_W$ = T2 |
| | $LS_W$ = T3 |
| | $RS_W$ = T4 |
| 1 | $C_W$ = LO-T2-T3 |
| | $R_W$ = RO-$C_W$-T4 |
| | $L_W$ = T2 |
| | $LS_W$ = T3 |
| | $RS_W$ = T4 |
| 2 | $C_W$ = RO-T2-T4 |
| | $L_W$ = LO-$C_W$-T3 |
| | $R_W$ = T2 |
| | $LS_W$ = T3 |
| | $RS_W$ = T4 |
| 3 | $LS_W$ = LO-T3-T2 |
| | $R_W$ = RO-T2-T4 |
| | $C_W$ = T2 |
| | $LS_W$ = T3 |
| | $RS_W$ = T4 |
| 4 | $L_W$ = LO-T2-T3 |
| | $RS_W$ = RO-T4-T2 |
| | $C_W$ = T2 |
| | $LS_W$ = T3 |
| | $R_W$ = T4 |
| 5 | $LS_W$ = LO-T3-T2 |
| | $RS_W$ = RO-T4-T2 |
| | $C_W$ = T2 |
| | $L_W$ = T3 |
| | $R_W$ = T4 |
| 6 | $C_W$ = RO-T2-T4 |
| | $LS_W$ = LO-T3-$C_W$ |
| | $R_W$ = T2 |
| | $L_W$ = T3 |
| | $R_W$ = T4 |
| 7 | $C_W$ = LO-T2-T3 |
| | $RS_W$ = RO-T4-$C_W$ |
| | $L_W$ = T2 |
| | $LS_W$ = T3 |
| | $R_W$ = T4 |
| 0 | $L_W$ = LO-T2 + $jS_W$ |
| | $R_W$ = RO-T2 − $jS_{wbp}$ |
| | $C_W$ = T2 |
| | $jLS_W$ = T3 |
| | $jRS_W$ = T4 |
| 1 | $C_W$ = LO-T2 + $jS_W$ |
| | $R_W$ = RO-$C_W$ − $jS_{wbs}$ |
| | $L_W$ = T2 |
| | $jLS_W$ = T3 |
| | $jRS_W$ = T4 |
| 2 | $C_W$ = RO-T2 − $jS_{wbp}$ |
| | $L_W$ = LO-$C_W$ + $jS_{wbp}$ |
| | $R_W$ = T2 |
| | $jLS_W$ = T3 |
| | $jRS_W$ = T4 |

In the above Table 1, the signal $jS_{wbp}$ in the case of dematrix procedure DP="10" is an output signal from a low pass filter with a response characteristic of $jS_w=0.5 * (jLS_w+jRS_w)$. Such a low pass filter is typically a filter finite impulse response (referred to hereinafter as IIR) filter. The IIR filter is adapted to input the average of left and right surround signals and to obtain the present output on the basis of the previous two sample inputs and the previous two sample outputs. The IIR filter has the following transfer function H(z):

$$H(z) = \frac{a_0(1 + 2z^{-1} + z^{-2})}{b_0 + b_1 z^{-1} + b_2 z^{-2}}$$

The following Table 2 shows coefficients of the IIR filter based on sampling frequencies.

TABLE 2

| SAMPLING FREQUENCY | $a_0$ | $b_0$ | $b_1$ | $b_2$ |
|---|---|---|---|---|
| 32 KHz | 486 | 2048 | −471 | 370 |
| 44.1 KHz | 295 | 2048 | −1394 | 521 |
| 48 KHz | 294 | 2048 | −1388 | 520 |

As seen from the above Table 2, the coefficients $a_0$, $b_0$, $b_1$ and $b_2$ of the IIR filter are different according to the sampling frequencies. Defining x(n) and y(n) respectively as input and output of the transfer function H(z) of the IIR filter in a time domain, the input and output relation can be expressed as follows:

$$y(n) = \frac{a_0}{b_0}x(n) + 2\frac{a_0}{b_0}x(n-1) + \frac{a_0}{b_0}x(n-2) - \frac{b_1}{b_0}y(n-1) - \frac{b_2}{b_0}y(n-2)$$

SUMMARY OF THE INVENTION

It is an object of the present invention to provide a dematrixing processor for an MPEG-2 multichannel audio decoder, which is capable of performing a decoding matrix process with respect to five compositely decoded signals to restore them to their original status.

In accordance with the present invention, the above and other objects can be accomplished by a provision of a dematrixing processor for an MPEG-2 multichannel audio decoder, comprising arithmetic/control logic means for performing a dematrixing operation with respect to five compositely decoded signals to restore them to their original status; and low pass filtering means for low pass filtering of an output signal from the arithmetic/control logic means and providing the low pass filtered result to the arithmetic/control logic means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
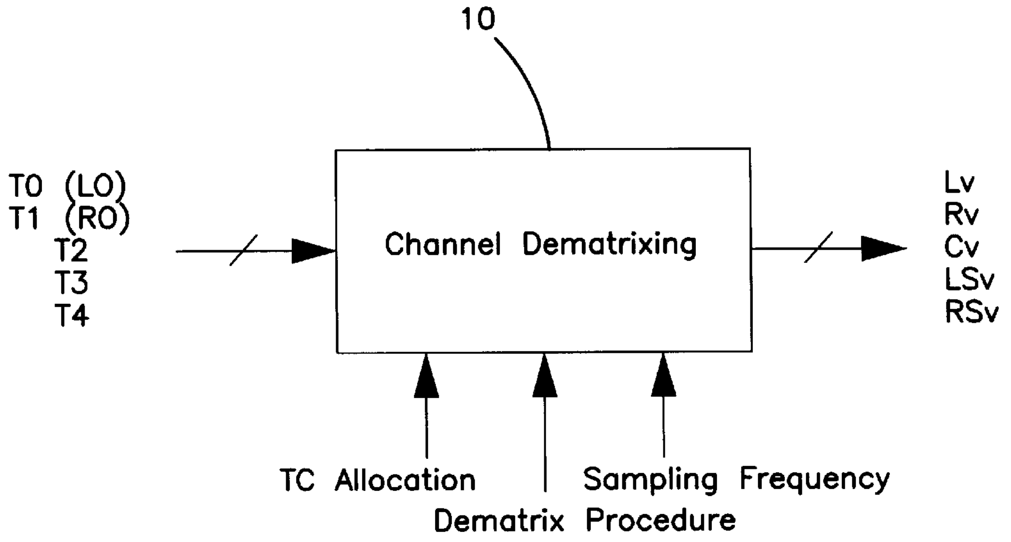
FIG. 1 is a schematic block diagram illustrating the construction of a dematrixing processor for an MPEG-2 multichannel audio decoder in accordance with the present invention.

Referring to FIG. 1, there is schematically shown, in block form, the construction of a dematrixing processor for an MPEG-2 multichannel audio decoder in accordance with the present invention. As shown in this drawing, the dematrixing processor, designated by the reference numeral 10, is adapted to perform a decoding matrix process with respect to five compositely decoded signals LO, RO, T2, T3 and T4 to restore them to their original status $L_w$, $R_w$, $C_w$, $LS_2$ and $RS_w$.

Figure 2:
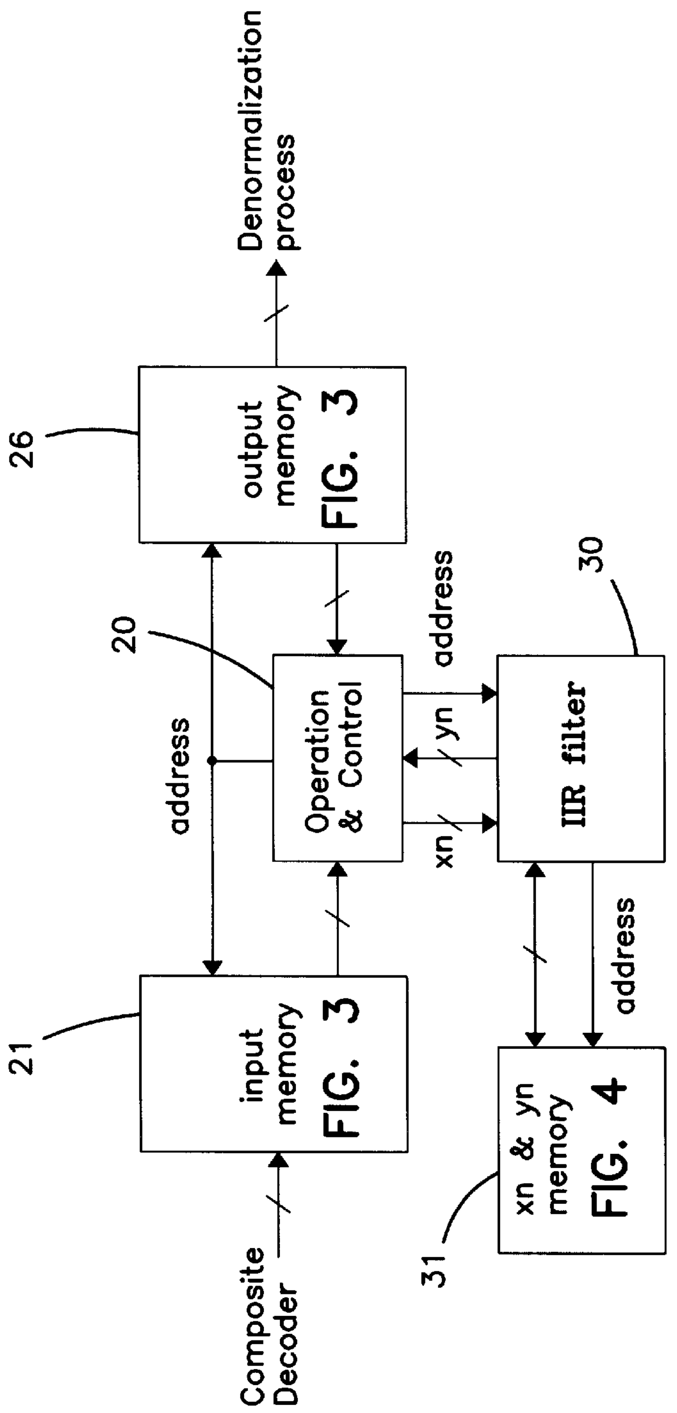
FIG. 2 is a detailed block diagram of the dematrixing processor in FIG. 1.

FIG. 2 is a detailed block diagram of the dematrixing processor 10 in FIG. 1. As shown in this drawing, the dematrixing processor 10 comprises an arithmetic/control logic unit 20 for performing a dematrixing operation with respect to the five compositely decoded signals LO, RO, T2, T3 and T4 to restore them to their original status $L_w$, $R_w$, $C_w$, $LS_w$ and $RS_w$, and an IIR filter 30 for low pass filtering of an output signal xn ($jS_w$) from the arithmetic/control logic unit 20 and providing the low pass filtered result yn ($jS_{wbp}$) to the arithmetic/control logic unit 20.

Figure 3:
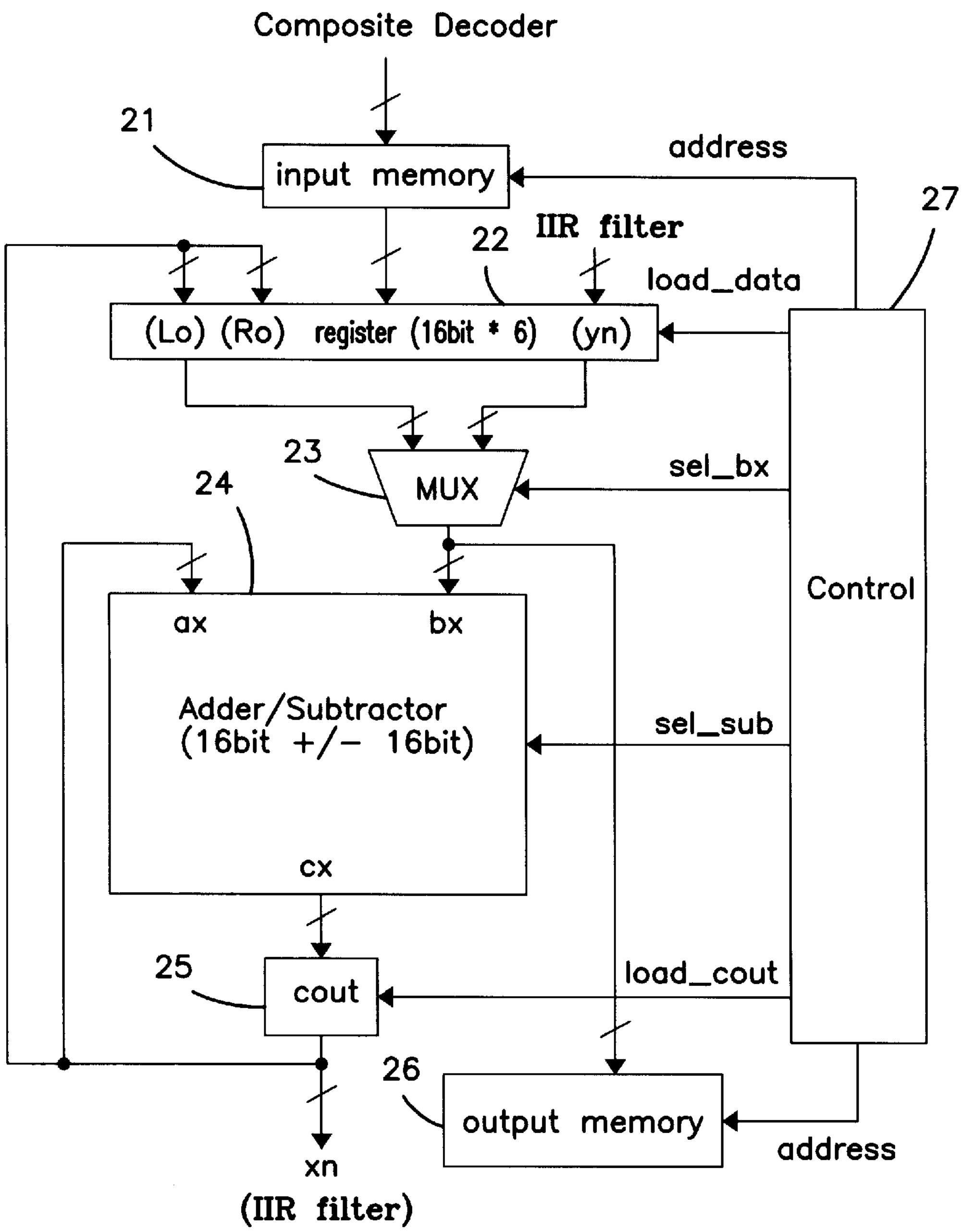
FIG. 3 is a detailed block diagram of an arithmetic/control logic unit in FIG. 2.

FIG. 3 is a detailed block diagram of the arithmetic/control logic unit 20 in FIG. 2. As shown in this drawing, the arithmetic/control logic unit 20 includes an input memory 21 for inputting the five compositely decoded signals LO, RO, T2, T3 and T4 and storing the inputted signals therein, a register part 22 for storing channel information and the output signal yn from the IIR filter 30 therein, a multiplexer 23 for selectively outputting data stored in the register part 22, an addition/subtraction part 24 for performing an addition or subtraction operation with respect to the output signal xn from the arithmetic/control logic unit 20 and the output data from the multiplexer 23, an output buffer 25 for buffering an output signal from the addition/subtraction part 24 and outputting the buffered signal to the IIR filter 30, an output memory 26 for sequentially storing the output data from the multiplexer 23 therein and outputting the stored data to a denormalization processor, and a control block 27 for supplying addresses to the input and output memories 21 and 26 and controlling the register part 22, multiplexer 23, addition/subtraction part 24 and output buffer 25.

The operation of the arithmetic/control logic unit 20 with the above-mentioned construction in accordance with the present invention will hereinafter be described in detail.

The arithmetic/control logic unit 20 is adapted to perform the addition or subtraction operation on the basis of the two parameters DP and TC and to determine the entire flow of the dematrixing process. Upon receiving the five compositely decoded signals LO, RO, T2, T3 and T4, the arithmetic/control logic unit 20 calculates the value xn and instructs the IIR filter 30 to calculate the value yn on the basis of the calculated value xn. Then, when the value yn is generated as a result of the low pass filtering operation of the IIR filter 30, the arithmetic/control logic unit 20 combines the five compositely decoded signals LO, RO, T2, T3 and T4 with the generated value yn from the IIR filter 30 to restore them to their original status $L_w$, $R_w$, $C_w$, $LS_w$ and $RS_w$ before the matrixing process. In order to perform the dematrixing process, the register part 22 must store all channel information and the output signal yn from the IIR filter 30 therein. To this end, the register part 22 is provided with six 16-bit registers. The control block 27 determines the load and output of the registers in the register part 22 over sequential cycles. The determined output of the register part 22 is applied to the addition/subtraction part 24 for the dematrixing process. The first output of the arithmetic/control logic unit 20 is xn, which is inputted to the IIR filter 30. Upon completing the low pass filtering operation, the IIR filter 30 outputs the value yn to the corresponding register in the register part 22 in the arithmetic/control logic unit 20. Then, the arithmetic/control logic unit 20 performs the dematrixing operation with respect to the five compositely decoded signals LO, RO, T2, T3 and T4 to restore them to their original status $L_w$, $R_w$, $C_w$, $LS_w$ and $RS_w$ before the matrixing process. The dematrixed signals $L_w$, $R_w$, $C_w$, $LS_w$ and $RS_w$ are sequentially stored into the output memory 26. The control block 27 is adapted to generate a plurality of control signals to control the above sequential operations over the sequential cycles.

Figure 4:
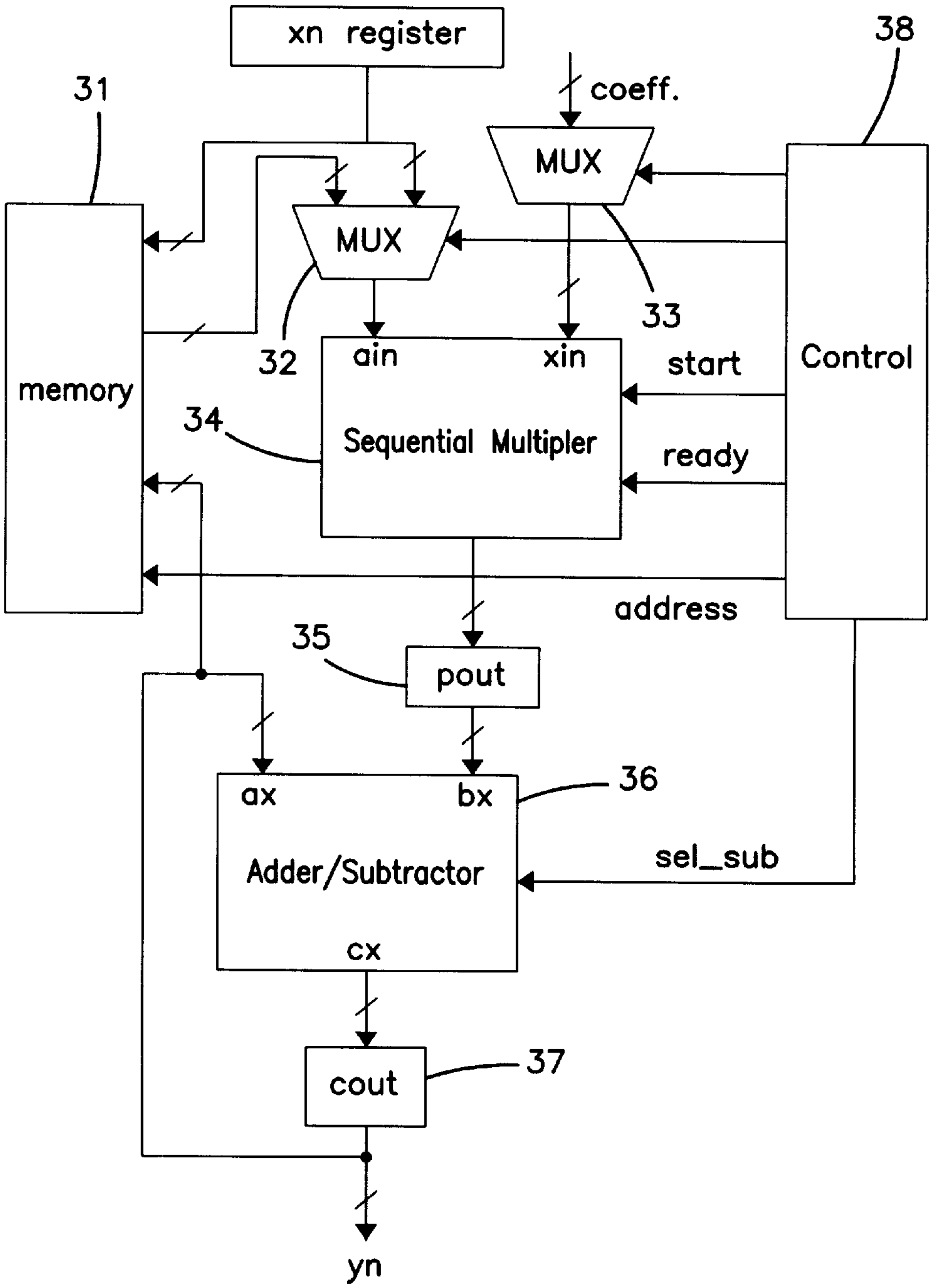
FIG. 4 is a detailed block diagram of an IIR filter in FIG. 2.

FIG. 4 is a detailed block diagram of the IIR filter 30 in FIG. 2. As shown in this drawing, the IIR filter 30 includes a memory 31 for storing the input and output values xn and yn of the IIR filter 30 therein, a first multiplexer 32 for selectively outputting an output signal from the memory 31 and the output signal xn from the arithmetic/control logic unit 20, a second multiplexer 33 for inputting filter coefficients and selectively outputting the inputted filter coefficients, a sequential multiplier 34 for performing a sequential multiplication operation with respect to output signals from the first and second multiplexers 32 and 33, a first output buffer 35 for buffering an output signal from the sequential multiplier 34, an addition/subtraction part 36 for performing an addition or subtraction operation with respect to an output signal from the first output buffer 35 and the output signal yn from the IIR filter 30, a second output buffer 37 for buffering an output signal from the addition/subtraction part 36 and outputting the buffered signal to the arithmetic/control logic unit 20, and a control block 38 for supplying an address to the memory 31 and controlling the first and second multiplexers 32 and 33, sequential multiplier 34 and addition/subtraction part 36.

The operation of the IIR filter 30 with the above-mentioned construction in accordance with the present invention will hereinafter be described in detail.

The IIR filter 30 is adapted to perform the low pass filtering operation. To this end, the IIR filter 30 performs multiplication and accumulation operations with respect to input data on the basis of given sampling frequency and coefficients. The previous values are required in performing the low pass filtering operation. To this end, the memory 31 is provided to store the previous values therein. In the case where the coefficients are taken as positive numbers with respect to the given sampling frequency, they are of 11 bits enabling the multiplication operation without information loss. As a result, the sequential multiplier 34 is designed to perform the sequential multiplication operation with respect to a 16-bit signed value and an 11-bit unsigned value. The addition/subtraction part 36 is adapted to perform the subtraction operation when the coefficients are negative numbers.

The sequential multiplier 34 has its one input terminal xin for inputting the filter coefficient from the second multiplexer 33 which is determined according to the sampling frequency under the control of the control block 38. The sequential multiplier 34 also has its other input terminal ain for inputting the output signal from the first multiplexer 32. As a result, the sequential multiplier 34 performs the sequential multiplication operation with respect to the output signals from the first and second multiplexers 32 and 33 and outputs the multiplied result to the addition/subtraction part 36 through the first output buffer 35. The addition/subtraction part 36 performs the addition or subtraction operation with respect to the output signal from the first output buffer 35 and the output signal yn from the second output buffer 37 and outputs the added or subtracted result to the arithmetic/control logic unit 20 through the second output buffer 37. At this time, the present input and output values of the IIR filter 30 are stored into the memory 31 so that they can be used as the previous values for the subsequent filtering operation.

Figure 5:
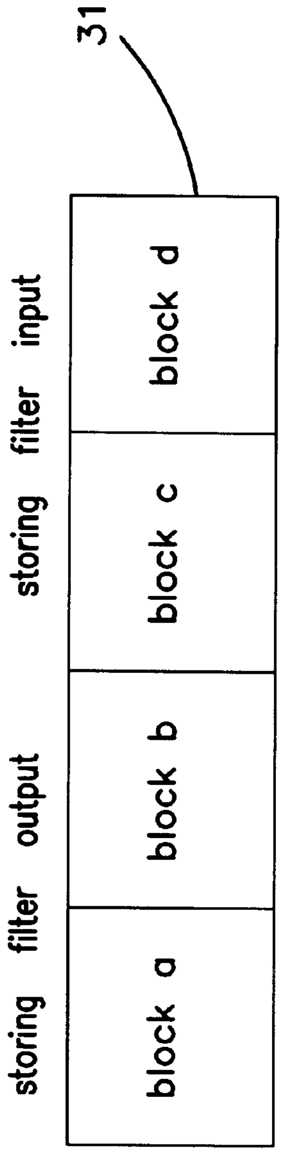
FIG. 5 is a view illustrating the configuration of a memory in FIG. 4.

FIG. 5 is a view illustrating the configuration of the memory 31 in FIG. 4. As shown in this drawing, the memory 31 is provided with four memory blocks a–d for storing two previous input values and two previous output values of the IIR filter 30 therein to satisfy the transfer function y(n) of the IIR filter 30 as mentioned above.

Two address bits A1 and A0 are used to address the four memory blocks a–d of the memory 31. In other words, addresses "00", "01", "10" and "11" correspond to the memory blocks a–d, respectively. Such addresses are generated by decoding the output of an internal counter and an address bit A2 designating the memory 31 in the dematrixing processor. The output of the internal counter is of two bits advanced in the order of "00", "01", "10" and "11".In the case where A2="0", the output of the internal counter is directly used to access the memory blocks in the order of a, b, c and d. In this case, the values y(n−2), y(n−1), x(n−1) and x(n−2) in the memory blocks a–d are accessed, respectively.

At that time the low pass filtering operation of the IIR filter 30 is completed, the output of the internal counter becomes "11", thereby causing the address to become "11" to designate the block d. As a result, the present input value of the IIR filter 30 is stored in the memory block d. Then, the bit values of the internal counter are inverted and the present output value of the IIR filter 30 is stored in the memory block corresponding to the resultant address "00". This procedure is performed with respect to all subband signals. The values y(n−1) , y(n−2), x(n−2) and x(n−1) in the memory blocks a–d are accessed, respectively, at the subsequent sample period where A2="1". The operation in the case where A2="1" is substantially the same as that in the case where A2="0", with the exception that the address bit A0 is generated by decoding an inverted one of the lower-order bit value of the internal counter. As a result, the addresses are advanced in the order of "01", "00", "11" and "10", thereby causing the memory blocks to be accessed in the order of b{y(n−2)}, a{y(n−1)}, d{x(n−1)} and c{x(n−2)}. If the low pass filtering operation of the IIR filter 30 is completed, the present input value of the IIR filter 30 is stored in the memory block c corresponding to the address "10" and the present output value of the IIR filter 30 is stored in the memory block b corresponding to the address "01". This procedure is performed with respect to all subband signals. Then, the values y(n−2), y(n−1), x(n−1) and x(n−2) in the memory blocks a–d are accessed, respectively, at the subsequent sample period where A2="0".

As is apparent from the above description, according to the present invention, the dematrixing processor for the MPEG-2 multichannel audio decoder can perform the decoding matrix process with respect to the five compositely decoded signals LO, RO, T2, T3 and T4 to restore them to their original status $L_w$, $R_w$, $C_w$, $LS_w$ and $RS_w$.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dematrixing processor for an MPEG-2 multichannel audio decoder, comprising:

an arithmetic/control logic means for performing a dematrixing operation with respect to five compositely decoded signals to restore them to their original status, wherein the arithmetic/control logic means to perform an addition or subtraction operation on the basis of two parameters with a dematrix procedure and a transmission channel allocation having channel matrixing information, said arithmetic/control logic means determining the entire flow of the dematrix procedure; and, a low pass filtering means for low pass filtering an output signal from said arithmetic/control logic means and for providing a low pass filtered result to said arithmetic/control logic means, wherein the low pass filtering means includes a memory provided with four memory blocks for storing two previous input values and two previous output values of the filtering means therein to satisfy a transfer function of the filtering means.

2. A dematrixing processor for an MPEG-2 multichannel audio decoder, as set forth in claim 1, wherein said arithmetic/control logic means includes:

an input memory for inputting the five compositely decoded signals and storing the inputted signals therein;

register means for storing channel information and an output signal from said low pass filtering means;

a multiplexer for selectively outputting data stored in said register means;

addition/subtraction means for performing an addition or subtraction operation with respect to the output signal from said arithmetic/control logic means and the output data from said multiplexer;

an output buffer for buffering an output signal from said addition/subtraction means and outputting the buffered signal to said low pass filtering means;

an output memory for sequentially storing the output data from said multiplexer therein and outputting the stored data to a denormalization processor; and control means for supplying addresses to said input and output memories and controlling said register means, multiplexer, addition/subtraction means and output buffer.

3. A dematrixing processor for an MPEG-2 multichannel audio decoder, as set forth in claim 2, wherein said register means includes six 16-bit registers.

4. A dematrixing processor for an MPEG-2 multichannel audio decoder, as set forth in claim 1, wherein said low pass filtering means includes:

a memory for storing input and output values of said low pass filtering means therein;

a first multiplexer for selectively outputting an output signal from said memory and the output signal from said arithmetic/control logic means;

a second multiplexer for inputting filter coefficients and selectively outputting the inputted filter coefficients;

a sequential multiplier for performing a sequential multiplication operation with respect to output signals from said first and second multiplexers;

a first output buffer for buffering an output signal from said sequential multiplier;

addition/subtraction means for performing an addition or subtraction operation with respect to an output signal from said first output buffer and an output signal from said low pass filtering means;

a second output buffer for buffering an output signal from said addition/subtraction means and outputting the buffered signal to said arithmetic/control logic means; and control means for supplying an address to said memory and controlling said first and second multiplexers, sequential multiplier and addition/subtraction means.

5. A dematrixing processor for an MPEG-2 multichannel audio decoder, as set forth in claim 4, wherein said sequential multiplier is adapted to perform the sequential multiplication operation with respect to a 16-bit signed value and an 11-bit unsigned value.

6. A dematrixing processor for an MPEG-2 multichannel audio decoder, as set forth in claim 4, wherein said memory includes four memory blocks for storing two previous input values and two previous output values of said low pass filtering means therein.

7. A dematrixing processor for an MPEG-2 multichannel audio decoder, comprising:

arithmetic/control logic means for performing a dematrixing operation with respect to five compositely decoded signals to restore them to their original status:

low pass filtering means for low pass filtering an output signal from said arithmetic/control logic means and providing a low pass filtered result to said arithmetic/control logic means;

said arithmetic/control logic means including:

an input memory for inputting the five compositely decoded signals to store as inputted signals therein;

register means for storing channel information and an output signal from said low pass filtering means;

a multiplexer for selectively outputting data stored in said register means;

addition/subtraction means for performing an addition or subtraction operation with respect to the output signal from said arithmetic/control logic means and the output data from said multiplexer;

an output buffer for buffering an output signal from said addition/subtraction means and outputting a buffered signal to said low pass filtering means;

an output memory for sequentially storing the output data from said multiplexer therein and outputting as stored data to a denormalization processor; and control means for supplying addresses to said input and output memories and controlling said register means, multiplexer, addition/subtraction means and output buffer.

8. A dematrixing processor for an MPEG-2 multichannel audio decoder, as set forth in claim 7, where the arithmetic/control logic means to perform an addition or subtraction operation on the basis of two parameters with a dematrix procedure and a transmission channel allocation having channel matrixing information, said arithmetic/control logic means determining the entire flow of the dematrixing procedure.

9. A dematrixing processor for an MPEG-2 multichannel audio decoder, as set forth in claim 7, wherein the low pass filtering means includes a memory provided with four memory blocks for storing two previous input values and two previous output values of the filtering means therein to satisfy a transfer function of the filtering means.

* * * * *